United States Patent
Fukagawa et al.

(10) Patent No.: US 6,529,745 B1
(45) Date of Patent: Mar. 4, 2003

(54) RADIO WAVE ARRIVAL DIRECTION ESTIMATING ANTENNA APPARATUS

(75) Inventors: Takashi Fukagawa, Kawasaki (JP); Youichi Nakagawa, Tokyo (JP); Takaaki Kishigami, Kawasaki (JP); Makoto Hasegawa, Tokyo (JP); Hiroyuki Tsuji, Yokohama (JP)

(73) Assignees: Matsushita Electric Industrial Co., Ltd., Osaka (JP); Takashi Iida, Tokyo (JP)

( * ) Notice: Subject to any disclaimer, the term of this patent is extended or adjusted under 35 U.S.C. 154(b) by 0 days.

(21) Appl. No.: 09/413,367

(22) Filed: Oct. 6, 1999

(30) Foreign Application Priority Data

Oct. 9, 1998 (JP) .......................................... 10-287739

(51) Int. Cl.$^7$ .............................. G01S 3/28; H04B 1/40
(52) U.S. Cl. ...................... 455/562; 455/456; 455/67.4; 342/378
(58) Field of Search ................................ 455/456, 561, 455/562, 67.1, 67.4, 272; 342/368, 371, 372, 373, 378, 147, 157, 450, 457, 442; 375/350

(56) References Cited

U.S. PATENT DOCUMENTS

| 5,515,378 A | | 5/1996 | Roy, III et al. |
| 5,815,117 A | * | 9/1998 | Kolanek ..................... 342/442 |
| 6,052,085 A | * | 4/2000 | Hanson et al. .............. 342/373 |

FOREIGN PATENT DOCUMENTS

| EP | 0777400 | 6/1997 |
| JP | 5-41607 | 2/1993 |

OTHER PUBLICATIONS

Kautz et al., "Beamspace DOA Estimation Featuring Multirate Eigenvector Processing", published Jul. 1, 1996.
English language abstract JP 5–41607.
"Efficient Utilization of Radio Spectrum through Intelligent Technology", S. Yoshimoto et al., CRL frequency resource project presentation paper, Oct. 1996.
"Trial Manufacture and Evaluation of Broadband Adaptive Array Antenna", Y. Kuwahara et al., Technical Report of IEICE, AP97–76, 1997–07, pp. 39–44, (1997).
"Antenna Theory and Design", W.L. Stutzman et al., Wiley, 1981, sections 10.32 and 10.33, pp. 534–536.
"A Recursive Algorithm for Tracking DOA's of Moving Targets by Using Linear Approximations", H. Kagiwada et al., Spawc'97 (1997).

* cited by examiner

Primary Examiner—Lester G. Kincaid
Assistant Examiner—Ronald J. Ward
(74) Attorney, Agent, or Firm—Greenblum & Bernstein, P.L.C.

(57) ABSTRACT

A mobile station transmitted signal received at array antenna 11 is converted into an intermediate frequency signal in frequency conversion section 12, and converted into a digital signal in analog-digital conversion section 13. Arrival direction estimating section 15 estimates the number of mobile stations and directions thereof by processing the digital signal. Arrival direction tracking section 16 estimates a direction of a mobile station by sequential processing using an estimated result in arrival direction estimating section 15. Beam forming means 17 forms an antenna radiation beam to a direction of the estimated result in arrival direction tracking section 16.

22 Claims, 12 Drawing Sheets

RADIO WAVE ARRIVAL DIRECTION ESTIMATING ANTENNA APPARATUS

BACKGROUND OF THE INVENTION

1. Field of the Invention

The present invention relates to a radio wave arrival direction estimating antenna apparatus for controlling a radiation pattern of an antenna used in a base station in a mobile communication system, mainly such as a portable telephone, a PHS and a pager.

2. Description of the Related Art

In a mobile communication field, as systems for accommodating a plurality of mobile stations in an area assigned for each base station, for example, Time Division Multiple Access (TDMA), Frequency Division Multiple Access (FDMA), and Code Division Multiple Access (CDMA) are practically used. A base station has a service area which is fixed with a predetermined size, and communicates mobile stations only existing in such an area. The frequency used by the base station and the mobile stations existing in the service area of the base station is also predetermined in such a manner that the interference does not occur in neighboring base stations and mutual mobile stations. Therefore, the number of mobile stations to be accommodated in an area of a base station is limited in the above-mentioned systems. Specifically, in the TDMA system, such a number is limited by the total number of communication slots assigned for mobile stations. In the FDMA system, such a number is limited by the total number of frequency channels. In the CDMA system, such a number is limited by an interference elimination capability determined by a ratio of a data transmission rate and a spread spectrum chip rate.

As a method for increasing an upper limit of the number of accommodated mobile stations, "Dynamic Zone Configuration" is proposed (for example, "Efficient Utilization of Radio Spectrum through Intelligent Technology" CRL frequency resource project presentation paper, October, 1996). In this technology, a radiation pattern of an antenna of a base station is transformed corresponding to the number of mobile stations existing around the base station and directions thereof, so that a shape of a radiation pattern area is transformed to a direction of a place where a large number of mobile stations exist. It is thereby possible to cancel an unbalance of communication traffic occurring in some region where a base station exists when the shape of the area is fixed, thus making it possible to increase the total number of terminals as mobile stations. Further, in this technology, it is possible to reduce interference in other mobile stations and base stations and to increase a communicable distance, by setting a beam of the radiation pattern to be narrow. In order to achieve such a technology, it is necessary to estimate the number of mobile stations and directions thereof by estimating arrival directions of radio waves from the mobile stations beforehand, and to direct a peak direction or a null direction of an antenna radiation pattern to the estimated direction. In a conventional technology, such a technique is achieved with a configuration composed of a radio wave arrival direction estimating section, a digital beam generating section and others, using a MUSIC method and an ESPRIT method as a radio wave arrival direction estimating technique, as described, for example, "Trial Manufacture and Evaluation of Broadband Adaptive Array Antenna" (Technical report of IEICE, AP97-76, 1997–07, Pages 39 to 44).

When the above-mentioned conventional technology is used, in the MUSIC method and the ESPRI method used as the radio wave arrival direction estimating technique, it is necessary to sample a large number of data to obtain the estimation, and to execute a large number of calculations, such as covariance matrix, eigen values, and eigen vectors, as the processing to perform the estimation.

Further, it is difficult to execute concurrent calculation processing, which is generally used to increase a processing speed, because the above-mentioned methods use a matrix calculation with a large number of elements. Therefore, there is a problem that the conventional methods are not applicable to the case where a mobile station is expected to pass though around a base station with a high speed.

SUMMARY OF THE INVENTION

An object of the present invention is to achieve a radio wave arrival direction estimating antenna apparatus for enabling the processing in a practical time for arrival direction estimation and antenna radiation pattern control with respect to a mobile station which moves around a base station with a high speed.

The object is achieved by a radio wave arrival direction estimating antenna apparatus having an array antenna with a plurality of antenna elements each for receiving a radio wave transmitted from a mobile station in a base station, a frequency converting section for frequency-converting a received RF frequency signal at each antenna element of the array antenna into a respective intermediate frequency signal, an analog-digital conversion section for converting the intermediate frequency signal into digital data, a downsampling section for sampling the digital data obtained in the analog-digital conversion section at a lower frequency, an arrival direction estimating section for estimating an arrival direction of the radio wave using digital data converted in the analog-digital conversion section, and an arrival direction tracking section for estimating a change of the arrival direction of the radio wave from the mobile station, using an estimated result by the arrival direction estimating section as an initial value and digital data sampled at a lower frequency by the downsampling section, to determine a direction sequentially.

According to the aforementioned configuration, the arrival direction estimating section estimates the number of mobile stations existing around the base station and positions thereof at certain intervals using the MUSIC method or the ESPRIT method. Using the estimated value as initial values, the arrival direction tracking section calculates a difference between a present direction where a mobile station exists and a previous direction obtained one sample before the present time, and estimates a direction of the mobile station using digital data. It is thereby possible to simplify the processing for estimating a direction of a mobile station, and to correctly estimate the number of mobile stations and directions thereof because the arrival direction estimating section estimates the number of mobile stations and directions thereof at certain intervals, thus enabling the judgment of a change of the number of mobile stations. Further, the arrival direction estimating section estimates an arrival direction of radio wave at a short interval, so that the arrival direction tracking section can track a moving of a mobile station adequately.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Embodiments of the present invention will be described below with reference to FIG. 1 to FIG. 12.

First Embodiment

Figure 1:
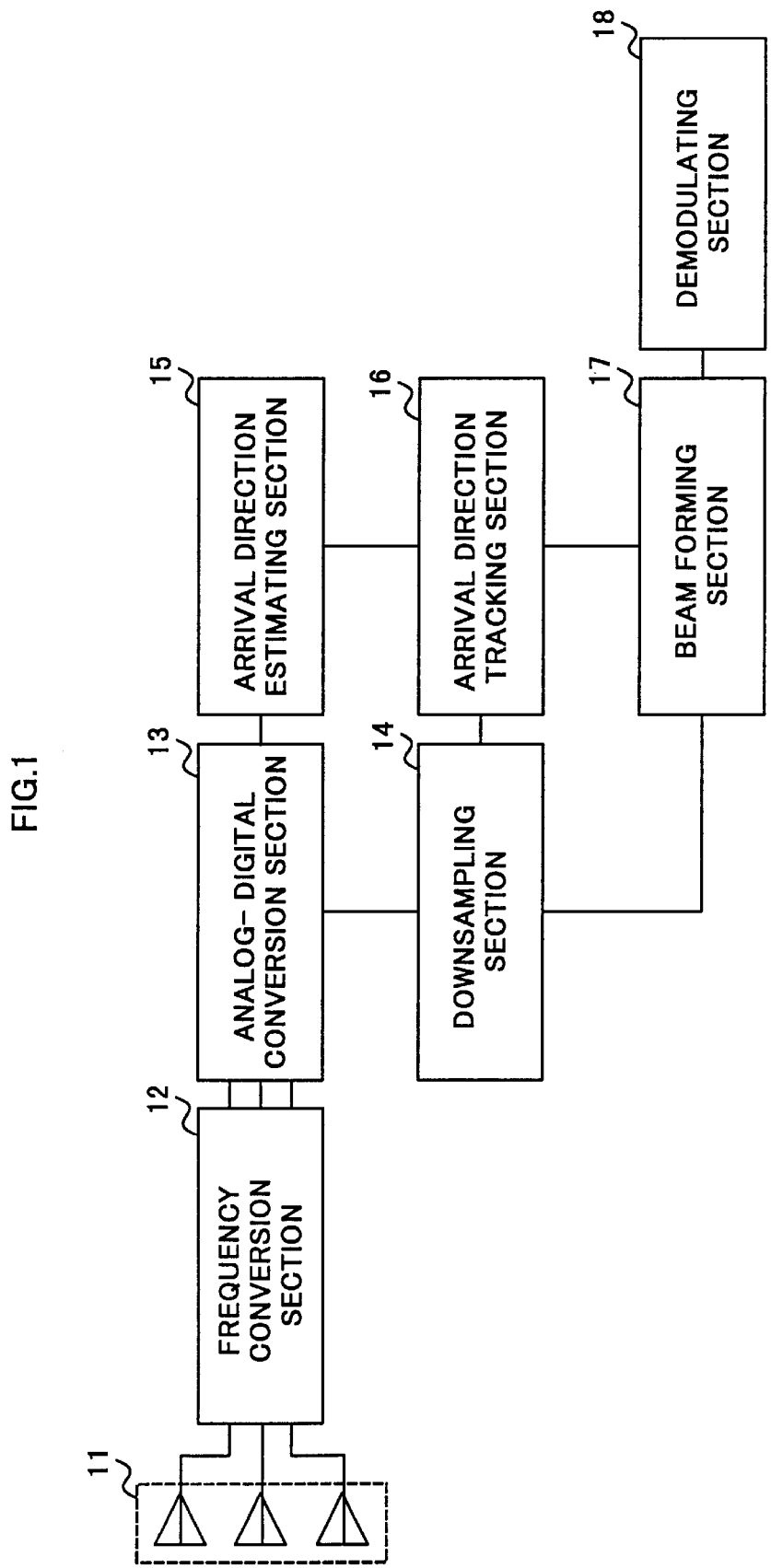
FIG. 1 is a block diagram illustrating a configuration of a radio wave arrival direction estimating antenna apparatus according to a first embodiment of the present invention.

FIG. 1 is a block diagram illustrating a configuration of a radio wave arrival direction estimating antenna apparatus according to the first embodiment of the present invention. In FIG. 1, reference number 11 denotes an array antenna, which is provided in a base station and has a plurality of antenna elements for receiving radio waves transmitted from mobile stations. Reference number 12 denotes a frequency conversion section which frequency-converts a received RF frequency signal received at each antenna element of array antenna 11 into a respective intermediate frequency signal. Reference number 13 denotes an analog-digital conversion section which converts the intermediate frequency signal into digital data. Reference number 14 denotes a downsampling section 13 which samples digital data from analog-digital conversion section 13 at a lower frequency. Reference number 15 denotes an arrival direction estimating section which estimates an arrival direction of a radio wave using digital data converted in analog-digital conversion section 13. Reference number 16 denotes an arrival direction tracking section which estimates a change of an arrival direction of a radio wave from a mobile station, using the estimated result in arrival direction estimating section 15 as an initial value, and digital data sampled at a lower frequency by downsampling section 14, to determine the direction sequentially. Reference number 17 denotes a beam forming section which directs a radiation beam of an antenna to the direction of the mobile station. Reference number 18 denotes a demodulating section which subjects a processed result obtained in beam forming section 17 to demodulation.

Beam forming section 17 determines a respective weighting coefficient for a received signal at each antenna element of array antenna 11, using the estimated result in arrival direction tracking section 16, multiplies digital data subjected to the conversion at a second frequency in downsampling section 14 by the weighting coefficient, and adds all multiplied results, thereby having a function for directing the radiation beam of the antenna to the direction of the mobile station.

Figure 2:
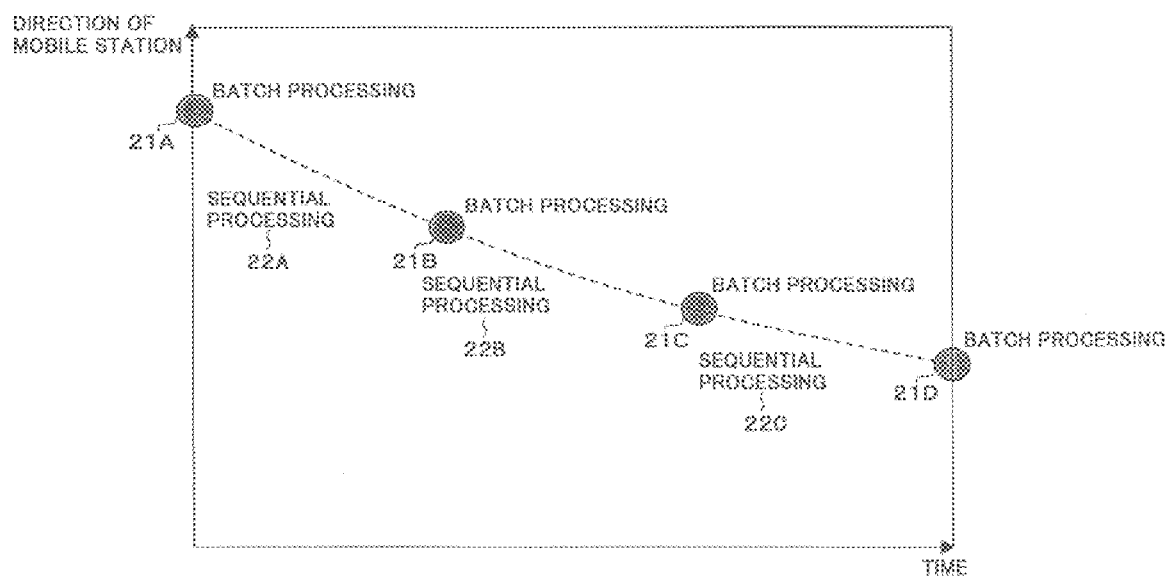
FIG. 2 is a diagram illustrating specific operations of an arrival direction estimating section and an arrival direction tracking section in the antenna apparatus illustrated in FIG. 1.

FIG. 2 is a diagram illustrating specific operations of arrival direction estimating section 15 and arrival direction tracking section 16. In FIG. 2, reference numbers 21A, 21B, 21C and 21D illustrate processing in arrival direction estimating section 15, and reference numbers 22A, 22B and 22C illustrate processing in arrival direction tracking section 16.

Figure 3:
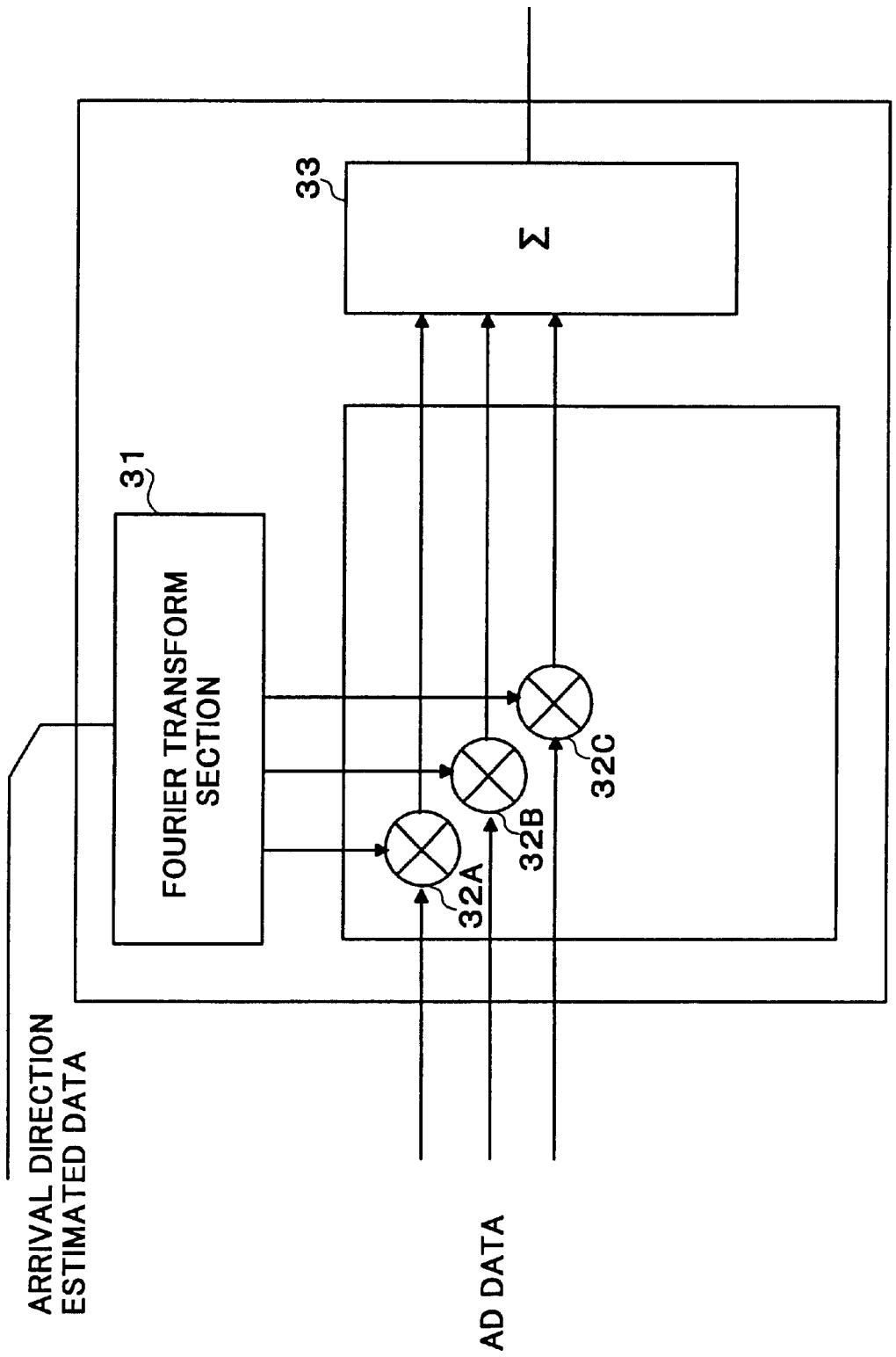
FIG. 3 is a diagram illustrating a specific example of a beam forming section in the antenna apparatus illustrated in FIG. 1.

FIG. 3 illustrates a specific example of beam forming section 17. In FIG. 3, reference number 31 denotes a Fourier transform section, reference numbers 32A, 32B and 32C each denotes a multiplier, and reference number 33 denotes an adder.

Figure 4:
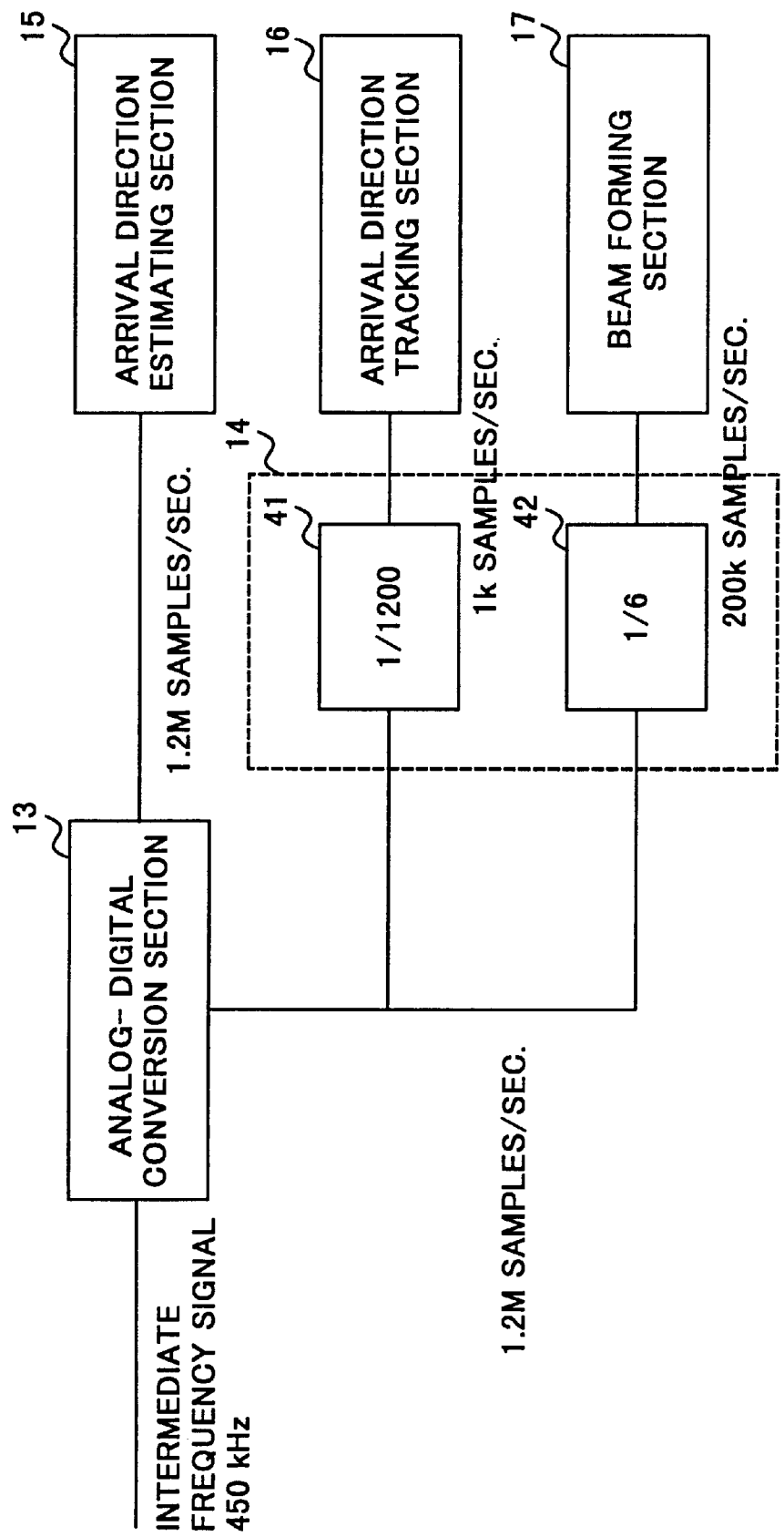
FIG. 4 is a diagram illustrating a first example of a downsampling section in the antenna apparatus illustrated in FIG. 1.
Figure 5:
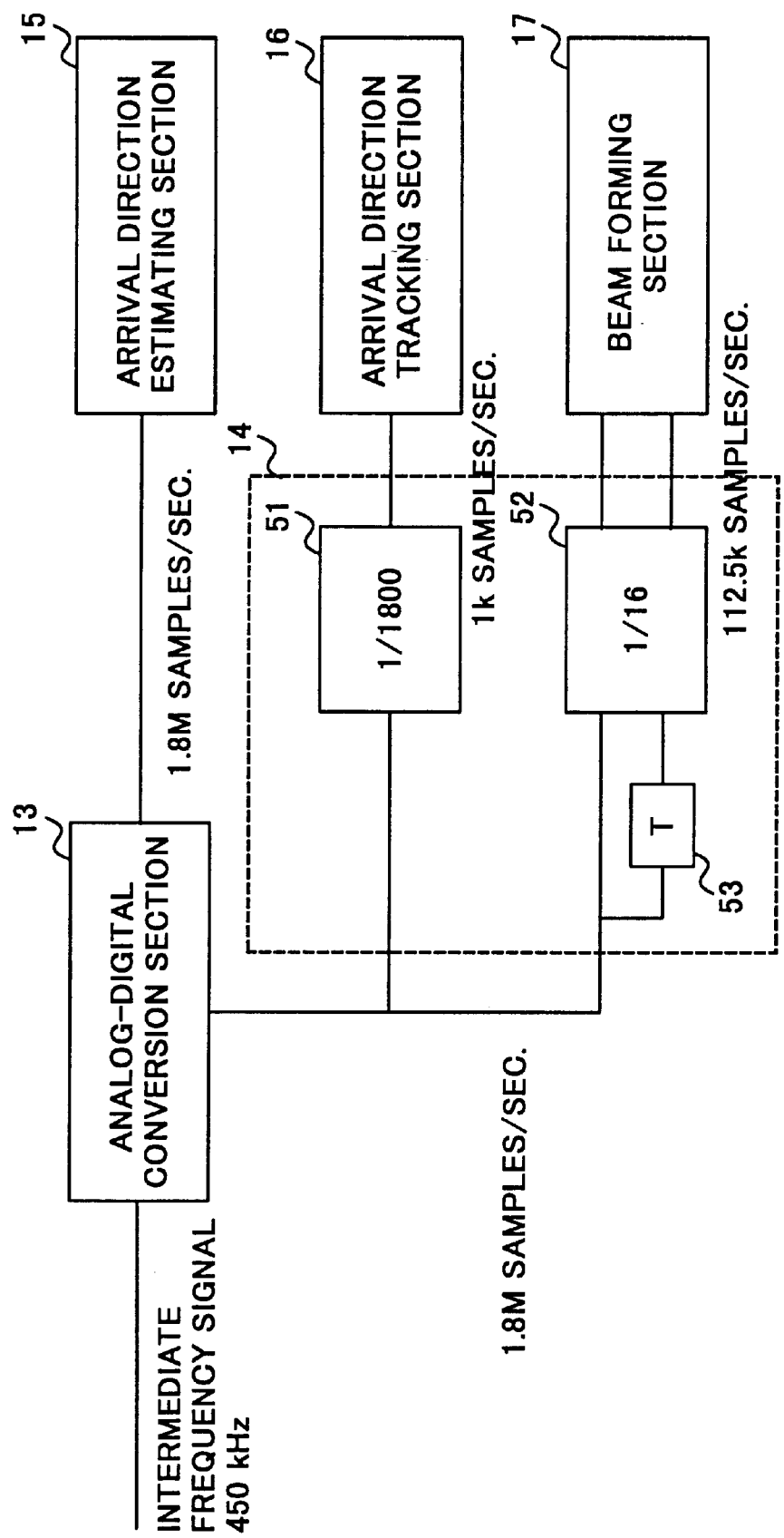
FIG. 5 is a diagram illustrating a second example of a downsampling section in the antenna apparatus illustrated in FIG. 1.

FIG. 4 illustrates a first specific example of the downsampling section. In FIG. 4, reference number 41 denotes a downsampling section for arrival direction tracking, and reference number 42 denotes a downsampling section for beam formation. FIG. 5 illustrates a second specific example of the downsampling section. In FIG. 5, reference number 51 denotes a downsampling section for arrival direction tracking, reference number 52 denotes a downsampling section for beam formation, and reference number 53 denotes a delay section.

The following description explains about operations of the radio wave arrival direction estimating antenna apparatus configured as described above. In FIG. 1, when a mobile station performs transmission around a base station, the base station receives the mobile station transmitted radio wave by array antenna 11. The RF frequency signal received at each antenna element of array antenna 11 is subjected to frequency conversion in frequency conversion section 12 with a local signal with the same phase to each other to obtain an intermediate frequency signal. Therefore, the intermediate frequency signals, of which the number is the same as that of the antenna elements, have the same relative phase differences and the same relative amplitude ratio respectively as those of the RF frequency signals received at antenna elements. The intermediate frequency signals are converted into digital data in analog-digital conversion section 13. When the predetermined sample number of the digital data is obtained, arrival direction estimating section 15 estimates an arrival direction of a radio wave from a mobile station by a method using eigen values and eigen vectors such as the MUSIC method and the ESPRIT method, thereby estimating a direction of a place where the mobile station exists.

Arrival direction estimating section 15 outputs an estimated result intermittently at the time the processing is finished without outputting the estimated result during a period spent by the predetermined number of digital data is obtained and then the processing for estimating the arrival direction of the radio wave using the obtained digital data is finished. The estimated result obtained in arrival direction estimating section 15 indicates the number of mobile stations and the direction of a place where the mobile stations exist, and is provided to arrival direction tracking section 16 as initial values. Downsampling section 14 converts the digital data with a conversion frequency provided in analog-digital conversion section 13 into digital data with a lower conversion frequency than that provided in analog-digital conversion section 13. Such conversion is performed by a constitution in which, for example, downsampling section 14 outputs digital data subjected to the conversion in analog-digital conversion section 13 once among N numbers of those (N is an integer).

FIG. 4 illustrates a first specific example of the downsampling section. In FIG. 4, the central frequency of the intermediate frequency signal is 450 kHz, and the sampling frequency in analog-digital conversion section 13 is 1.2M samples/sec. Downsampling section 41 for arrival direction tracking outputs one with respect to 1,200 samples of data output from analog-digital conversion section 13 in order to output at a rate of 1K sample/sec. that is a processing rate of arrival direction tracking section 16. Downsampling section 42 for beam formation outputs one with respect to 6 samples to output at a rate of 200K samples/sec. The rate of 200K samples/sec. is 1/(M+0.25) (M=1) times the frequency 450 KHz of an intermediate frequency signal, and in this case, the data is sampled highly to be signals with a central frequency of 50 KHz.

FIG. 5 illustrates a second specific example of the downsampling section. In FIG. 5, the central frequency of the intermediate frequency signal is 450 KHz, and the sampling frequency in analog-digital conversion section 13 is 1.8M samples/sec. Downsampling section 51 for arrival direction tracking outputs one with respect to 1,800 samples of data output from analog-digital conversion section 13 in order to output at a rate of 1K sample/sec. that is a processing rate of arrival direction tracking section 16. Downsampling section 52 for beam formation outputs one with respect to 16 samples to output at a rate of 112.5K samples/sec. The rate of 112.5K samples/sec. is 1/M+0.25 times the intermediate frequency+(band width/2), where the intermediate frequency is 450 KHz, the band width is 56.25 and M=4, and in this case, the data is sampled highly to be signals with a central frequency of 0 KHz. Delay section 53 provides a delay corresponding to one sample of 1.8M samples per sec. According to the aforementioned processing, it is possible to obtain I signals and Q signals by using downsampled data and delayed downsampled data, thereby enabling the apparatus to perform the frequency conversion without having a mixer circuit.

In FIG. 1, arrival direction tracking section 16 next estimates a direction of a moving mobile station by sequential processing using the number of mobile stations and directions of the mobile stations, which are estimated results in arrival direction estimating section 15, as initial values. FIG. 2 illustrates a relation between processing in arrival direction estimating section 15 and processing in arrival direction tracking section 16 when a mobile station moves. At a time of 21A, arrival direction estimating section 15 outputs the estimated result. During a period of 21A to 22B (22A) at which arrival direction estimating section 15 outputs a next value by batch processing such as data collection and calculation of eigen values, arrival direction tracking section 16 outputs an estimated result sequentially using the result obtained at 21A whenever obtains an input sample of data. The processing in arrival direction tracking section 16 is executed, for example, using the method described in detail in "A Recursive Algorithm for Tracking DOA's of Moving Targets by Using Linear Approximations" spawc' 97 in Paris, 1997, by H.Kagiwada et al. In this method, an angle of a direction of a mobile station and a change of an angle thereof are estimated so as to minimize a mean square of a difference between an estimated value of a present received signal at each antenna element in array antenna 11 which is estimated from sampling data that is sampled one sample before the present and a change rate of an angle thereof and an actual value of a present received signal at each antenna element in array antenna 11.

Beam forming section 17 calculates a radiation pattern of an antenna so that the peak of the radiation pattern is directed to the direction of the mobile station estimated in arrival direction tracking section 16. FIG. 3 illustrates a specific content of processing in beam forming section 17. The estimated data for arrival direction of mobile station transmitted radio wave obtained in arrival direction tracking section 16 is used as a coefficient in synthesizing a radiation beam of an antenna. Fourier transform section 31 subjects the estimated data to Fourier transform, thereby obtaining a respective weighting coefficient for a received signal at each antenna element. As the method for synthesizing a radiation beam of an antenna, for example, the Woodward-Lawson Sampling method is used (for example, refer to W. L. Stutzman et al "Antenna Theory and Design", Wiley 1981, pp534–536, for more details). In beam forming section 17, multipliers 32A, 32B and 32C each multiplies respective digital data by a weighting coefficient, and then adder 33 adds data for all antenna elements. Demodulating section 18 performs the demodulation using the processed result in beam forming section 17.

As described above, according to this embodiment, arrival direction estimating section 15 estimates initial values for the number of mobile stations and directions thereof, and based on the initial values, arrival direction tracking section 16 executes processing sequentially to estimate a direction of a place where a mobile station exists, beam forming section 17 forms a radiation beam of an antenna, and then the demodulation is executed. It is thus possible to appropriately direct an antenna beam to a mobile station which moves at a high speed, and thereby to achieve high quality transmission between a base station and each of mobile stations.

Second Embodiment

Figure 6:
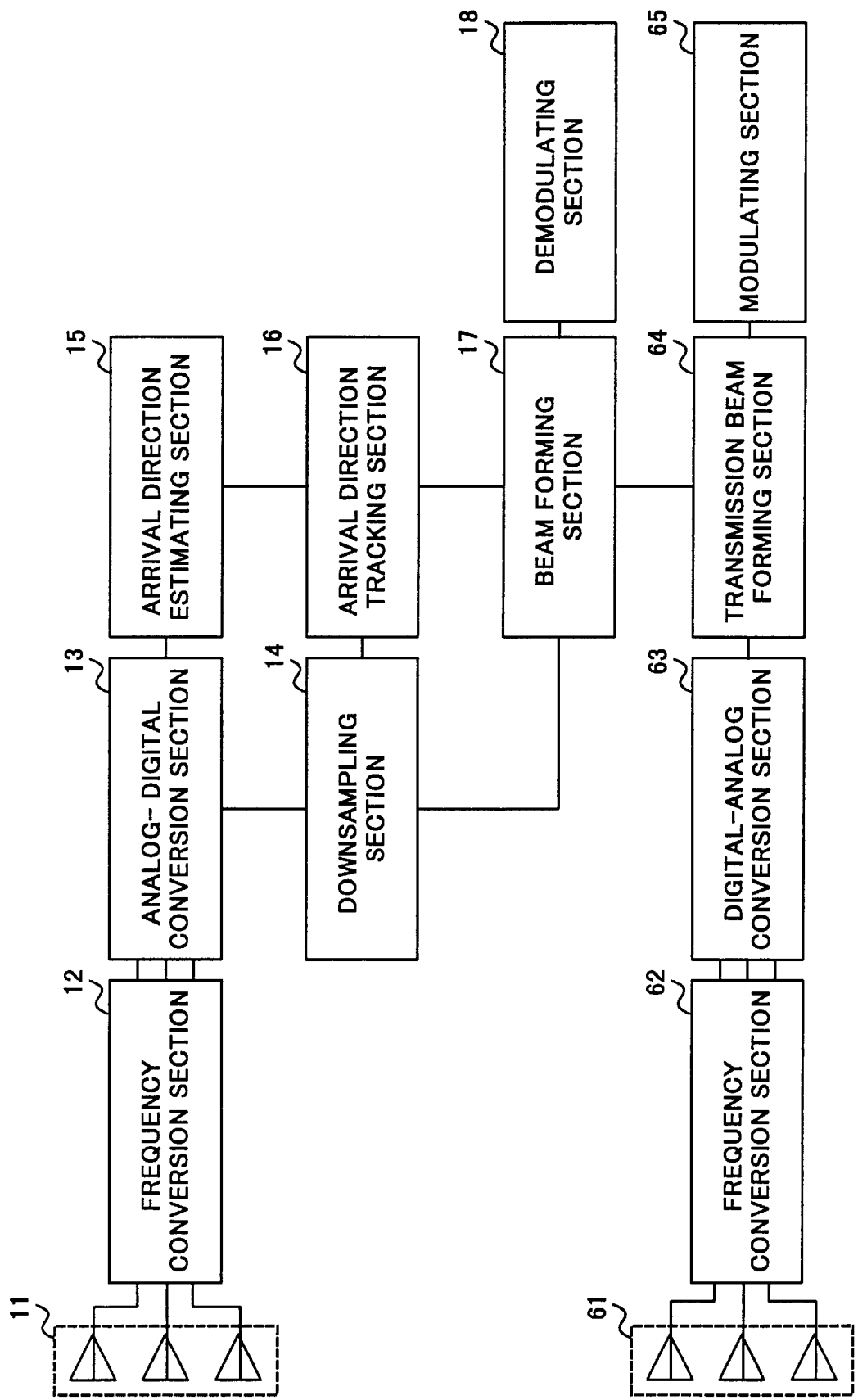
FIG. 6 is a block diagram illustrating a configuration of a radio wave arrival direction estimating antenna apparatus according to a second embodiment of the present invention.

FIG. 6 is a block diagram illustrating a configuration of a radio wave arrival direction estimating antenna apparatus according to the second embodiment of the present invention. As can be seen from FIG. 6, the radio wave arrival direction estimating antenna apparatus according to the second embodiment has basically the same configuration as that in the first embodiment. In FIG. 6, reference number 11 denotes an array antenna, which is provided in a base station and has a plurality of antenna elements for receiving radio waves transmitted from mobile stations. Reference number 12 denotes a frequency converting section which frequency-converts a received RF frequency signal received at each antenna element of array antenna 11 into a respective intermediate frequency signal. Reference number 13 denotes an analog-digital conversion section which converts the intermediate frequency signal into digital data. Reference number 14 denotes a downsampling section 13 which samples digital data from analog-digital conversion section 13 at a lower frequency. Reference number 15 denotes an arrival direction estimating section which estimates an arrival direction of a radio wave using digital data converted in analog-digital conversion section 13. Reference number 16 denotes an arrival direction tracking section which estimates a change of an arrival direction of a radio wave from a mobile station, using the estimated result in arrival direction estimating section 15 as an initial value, and digital data sampled at a lower frequency by downsampling section 14, to determine the direction sequentially. Reference number 17 denotes a beam forming section which directs a radiation beam of an antenna to the direction of the mobile station. Reference number 18 denotes a demodulating section which subjects a processed result obtained in beam forming section 17 to demodulation. Beam forming section 17 determines a respective weighting coefficient for a received signal at each antenna element of array antenna 11, using the estimated result in arrival direction tracking section 16, multiplies digital data subjected to the conversion at a second frequency in downsampling section 14 by the weighting coefficient, and adds all multiplied results, thereby having a function for directing the radiation beam of the antenna to the direction of the mobile station.

Further, the apparatus of the second embodiment is provided with a transmission function section. In FIG. 6, reference number 61 denotes a transmission array antenna, which is provided in a base station and has a plurality of antenna elements for transmitting a transmission signal to a mobile station. Reference number 62 denotes a frequency conversion section which frequency-converts an analog signal into a transmission RF frequency signal to provide to array antenna 61. Reference number 64 denotes a transmission beam forming section which multiplies a baseband signal by a weighting coefficient corresponding to each antenna element determined by reception beam forming section 17 to generate a weighted transmission signal, and directs a radiation beam of the antenna to a direction of a mobile station. Reference number 63 denotes a digital-analog conversion section which converts the weighted transmission signal into an analog signal. Reference number 65 denotes a modulating section which generates a modulated signal of digital baseband signal to be transmitted. Further, array antenna 61 has a function for transmitting the transmission RF frequency signal.

Figure 7:
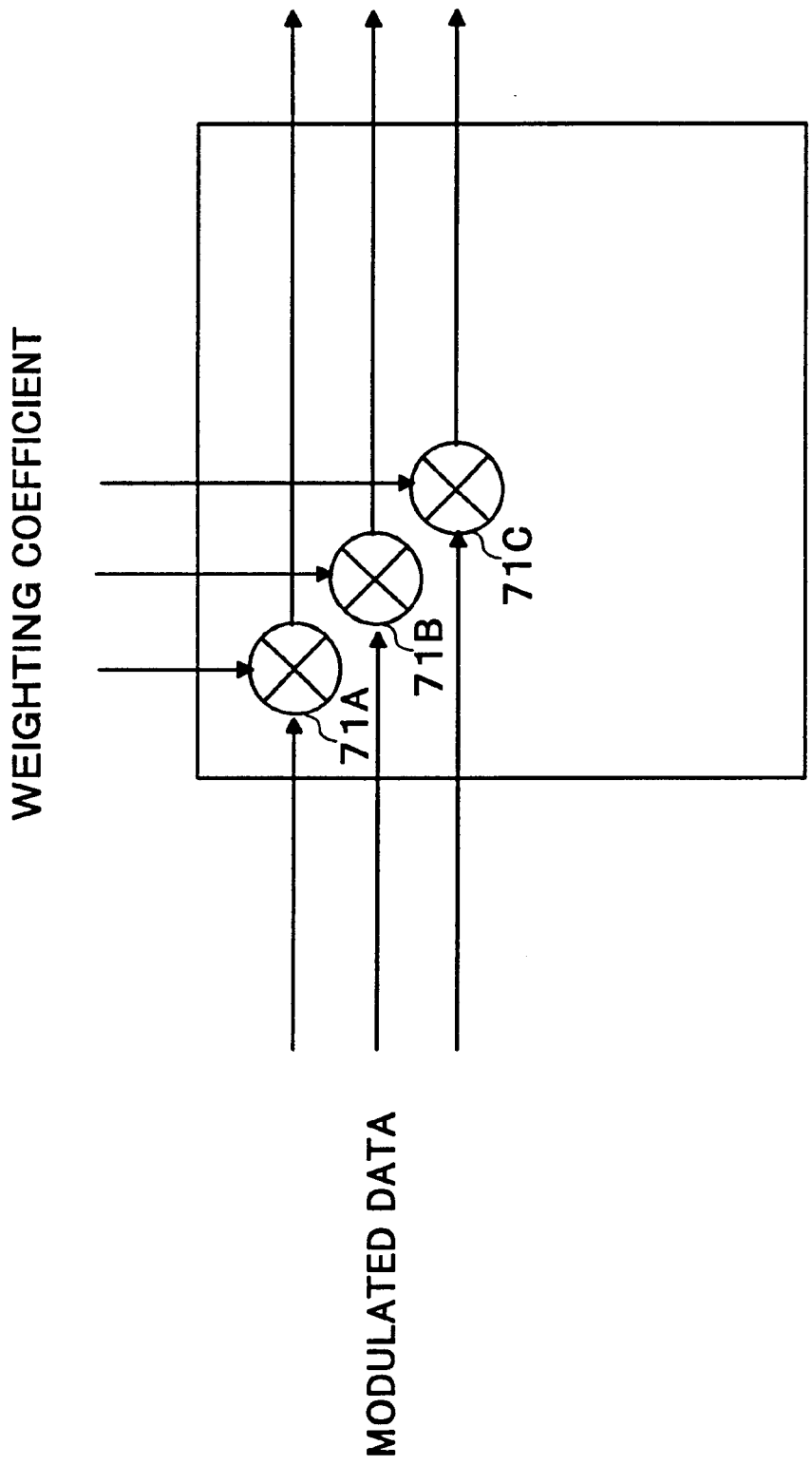
FIG. 7 is a diagram illustrating an example of a transmission beam forming section in the antenna apparatus of the present invention.

FIG. 7 is a diagram illustrating a specific example of the transmission beam forming section. In FIG. 7, reference numbers 71A, 71B and 71C each denotes a multiplier which multiplies modulated data by a weighting coefficient.

The following description will explain about operations in the radio wave arrival direction estimating antenna apparatus configured as described above. As described in the first embodiment, in FIG. 6, a direction of a mobile station is estimated by arrival direction estimating section 15 and arrival direction tracking section 16, and based on the estimated result, a weighting coefficient is determined by beam forming section 17.

Modulating section 65 generates a modulated signal of digital baseband signal to be transmitted to a mobile station. A weighted transmission signal is generated by multiplying the modulated signal by the respective weighting coefficient corresponding to each antenna element of array antenna determined by beam forming section 17 at the time of receiving.

As illustrated in FIG. 7, a modulated signal of baseband signal is subjected to the multiplication by numeric calculation in each of multipliers 71A, 71B and 71C. The processed result is digital data corresponding to the number of antenna elements. Next, as illustrated in FIG. 6, the digital data is converted into analog signals in digital-analog conversion section 63, and then converted into the transmission RF frequency signal in frequency conversion section 62. The transmission RF frequency signal is transmitted from transmission array antenna 61 which has the same radiation property as the reception array antenna 11, thus a radio wave is transmitted with a radiation beam of the antenna directed to a direction of a mobile station. In this embodiment, array antenna 11 for receiving and transmission array antenna 61 are provided independently. Therefore, it is possible to prevent a transmission signal from leaking to a reception section, and thereby to prevent reception performance from deteriorating. Further, in the case of a communication system in which timings of transmission and reception are divided according to time, it is possible to use a common array antenna as transmission array antenna 61 and reception array antenna 11, by providing the apparatus with a switch which switches between transmission and reception, in synchronization with such timings.

As described above, according to the invention in this embodiment, since the weighting coefficient determined in beam forming section 17 at the time of receiving is used without any processing, it is possible to form a transmission beam to a mobile station which moves at a high speed in transmission beam forming section 64, with a simple configuration. Further, by forming a transmission beam properly, it is possible to prevent the generation of interference in other base stations and mobile stations, and further to reduce transmission power to a target mobile station.

In the antenna apparatus of the present invention, since the apparatus is provided with a transmission array antenna for transmitting a transmission RF frequency signal to have a reception antenna and a transmission antenna separately, the transmission can be performed without mutual interference of transmission and received signals at a RF circuit.

Third Embodiment

Figure 8:
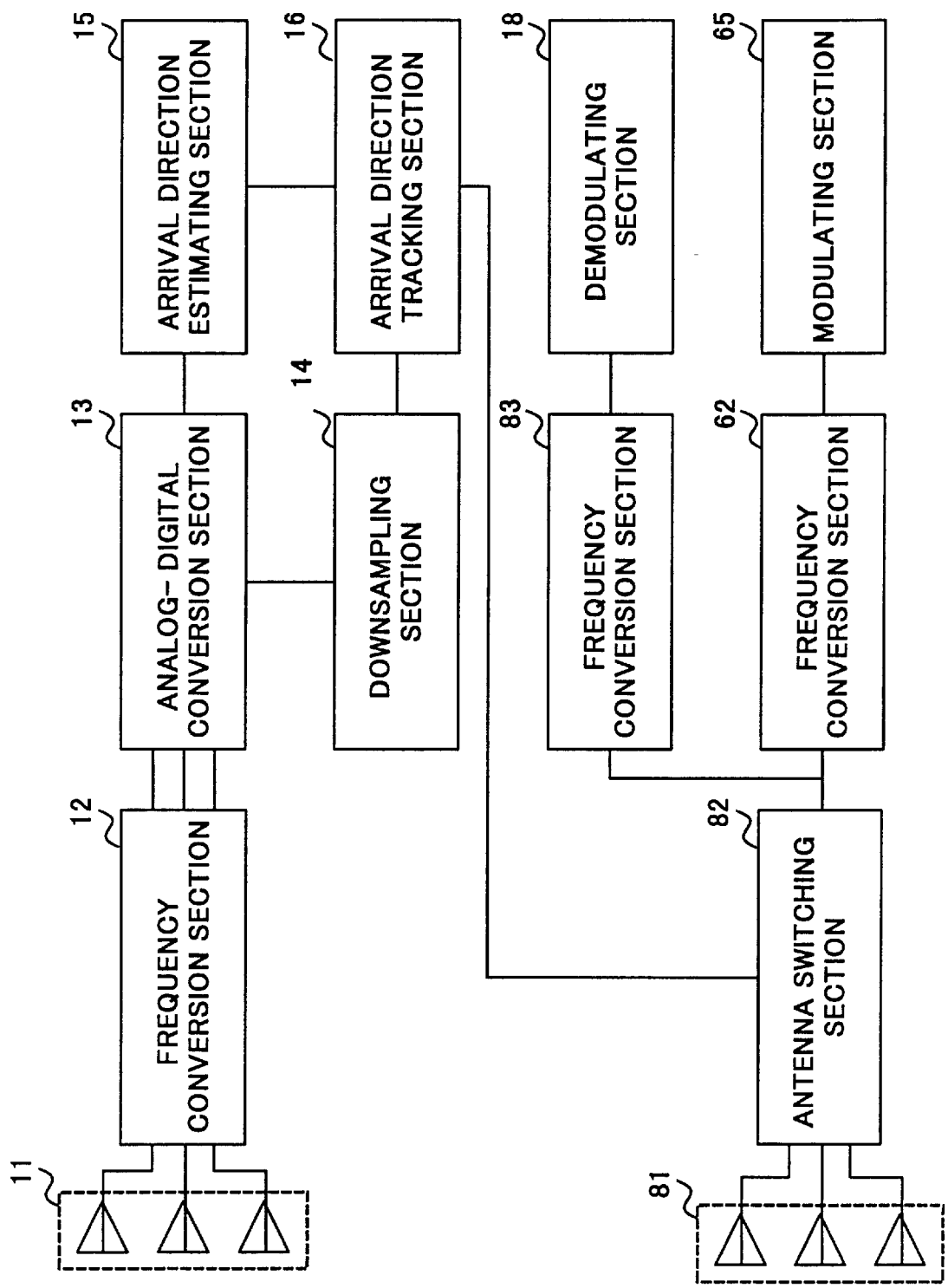
FIG. 8 is a block diagram illustrating a configuration of a radio wave arrival direction estimating antenna apparatus according to a third embodiment of the present invention.
Figure 9:
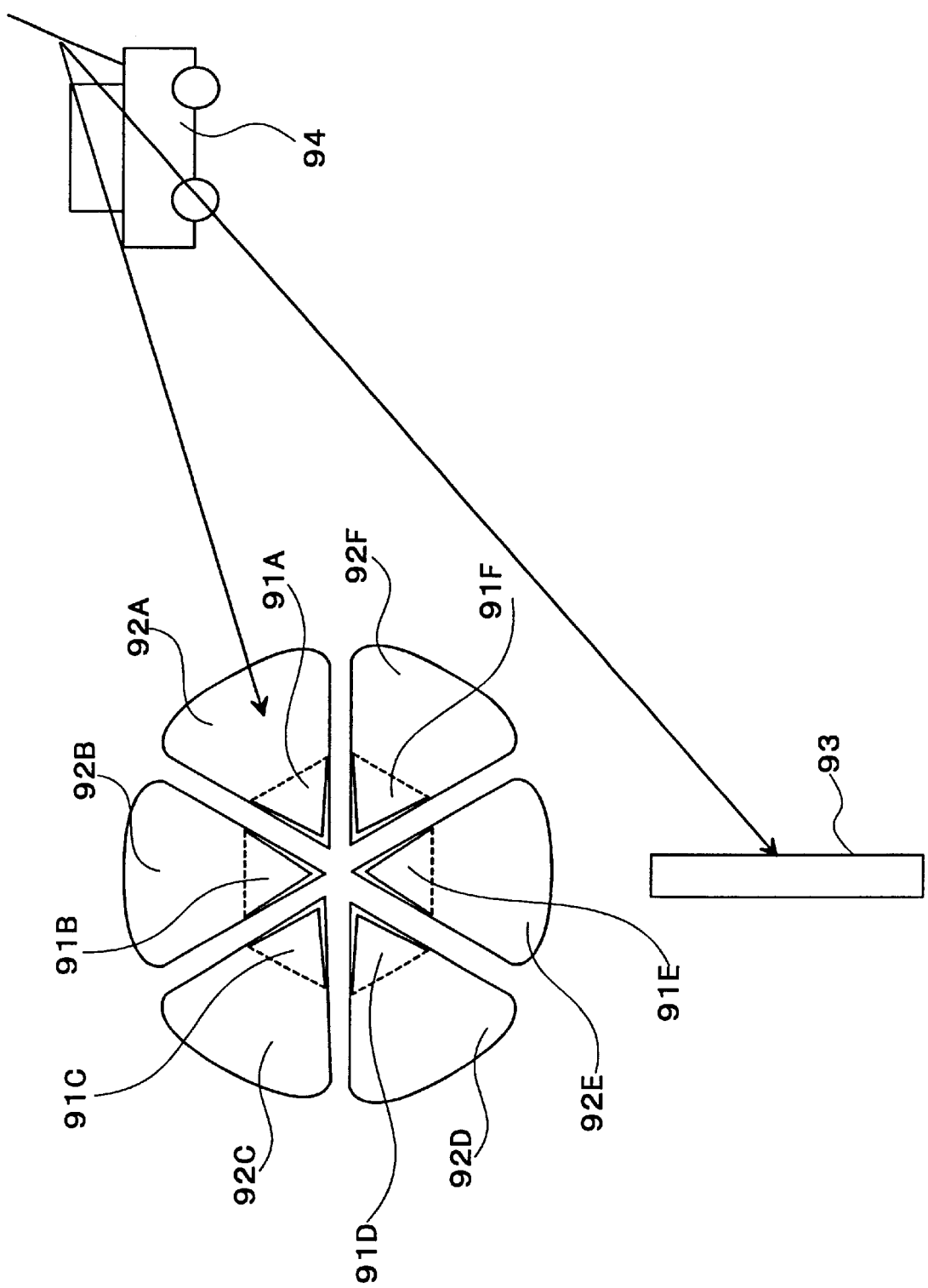
FIG. 9 is a concept diagram illustrating operations of an antenna switching section in the antenna apparatus of the present invention.

FIG. 8 is a block diagram illustrating a configuration of a radio wave arrival direction estimating antenna apparatus according to the third embodiment. In FIG. 8, reference number 81 denotes a sector antenna, reference number 82 denotes an antenna switching section, and reference number 83 denotes a frequency conversion section. FIG. 9 is a concept diagram illustrating operations of an antenna switching section. In FIG. 9, reference numbers 91A, 91B, 91C, 91D, 91E and 91F each denotes an antenna radiation pattern of respective antenna element of the sector antenna, reference number 93 denotes an array antenna, and reference number 94 denotes a mobile station.

The following description will explain about operations in the radio wave arrival direction estimating apparatus configured as described above. In FIG. 8, arrival direction tracking section 16 estimates a direction of a place where a mobile station exists, and the estimated result is provided to antenna switching section 82. The antenna switching section 82 selects an antenna element of which the radiation pattern is a boresight to the direction of the mobile station among from antenna elements of sector antenna 81. In an example in FIG. 9, sector antenna 92 is composed of six antenna elements. Each antenna element has an antenna radiation pattern capable of transmitting or receiving radio waves in a range of 60 degrees as illustrated in FIG. 92A to FIG. 92F. In this case, a direction of a mobile station is estimated based on a radio wave received at array antenna 93, and then antenna switching section 82 selects antenna element 92 A of which the boresight of the radiation pattern is directed to a direction of mobile station 94, thereby receiving/transmitting a radio wave from/to a mobile station. In FIG. 8, frequency conversion section 83 and frequency conversion section 62 are provided respectively for demodulation and modulation besides frequency conversion section 12.

As described above, according to the invention in this embodiment, since the apparatus switches a sector antenna based on a direction of a mobile station estimated in the arrival direction tracking section to perform transmission or reception, even in the case where high rate transmission is performed as compared to capable rate for digital processing, it is possible to control the antenna radiation pattern to perform data transmission with high accuracy.

Fourth Embodiment

Figure 10:
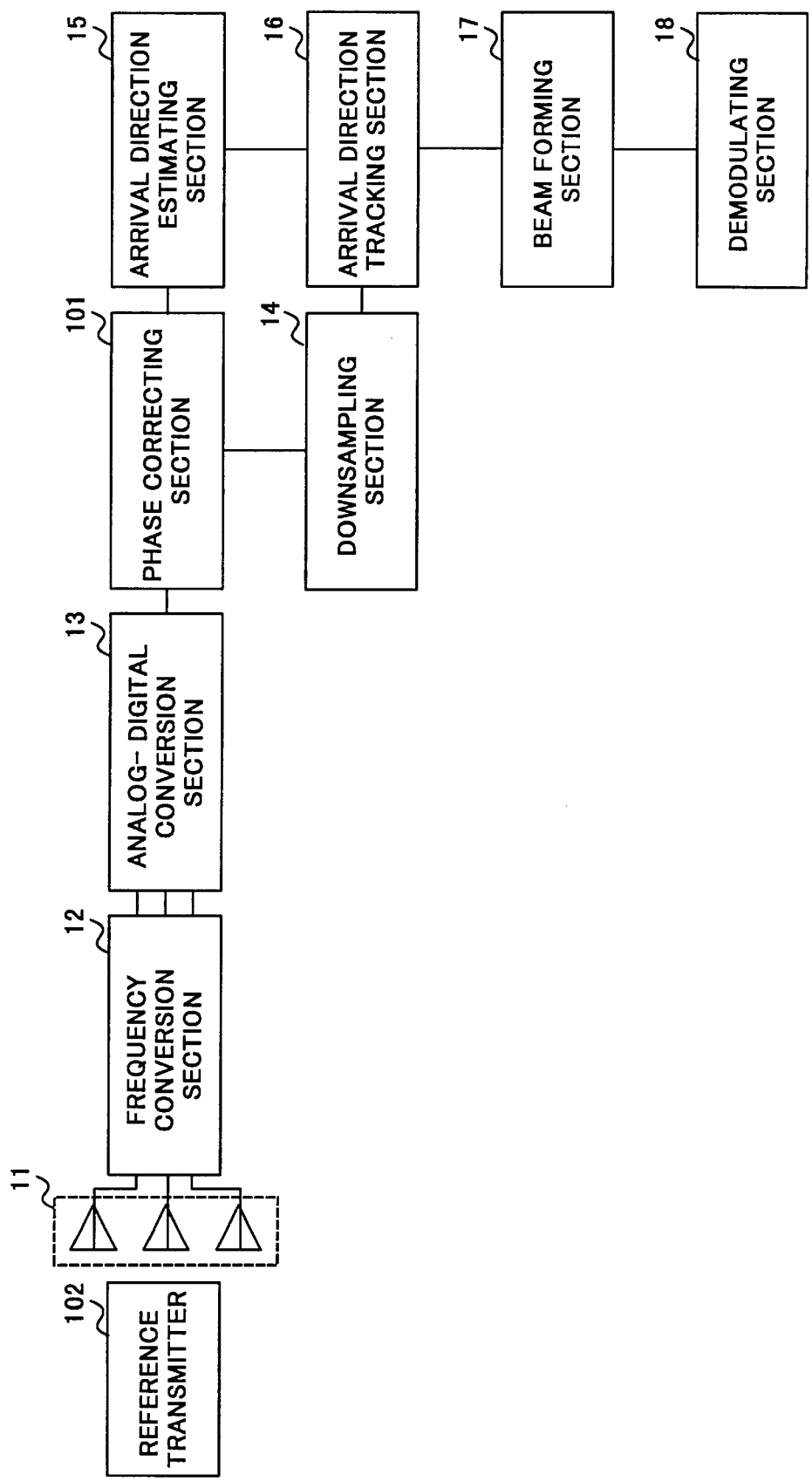
FIG. 10 is a block diagram illustrating a configuration of a radio wave arrival direction estimating antenna apparatus according to a fourth embodiment of the present invention.
Figure 11:
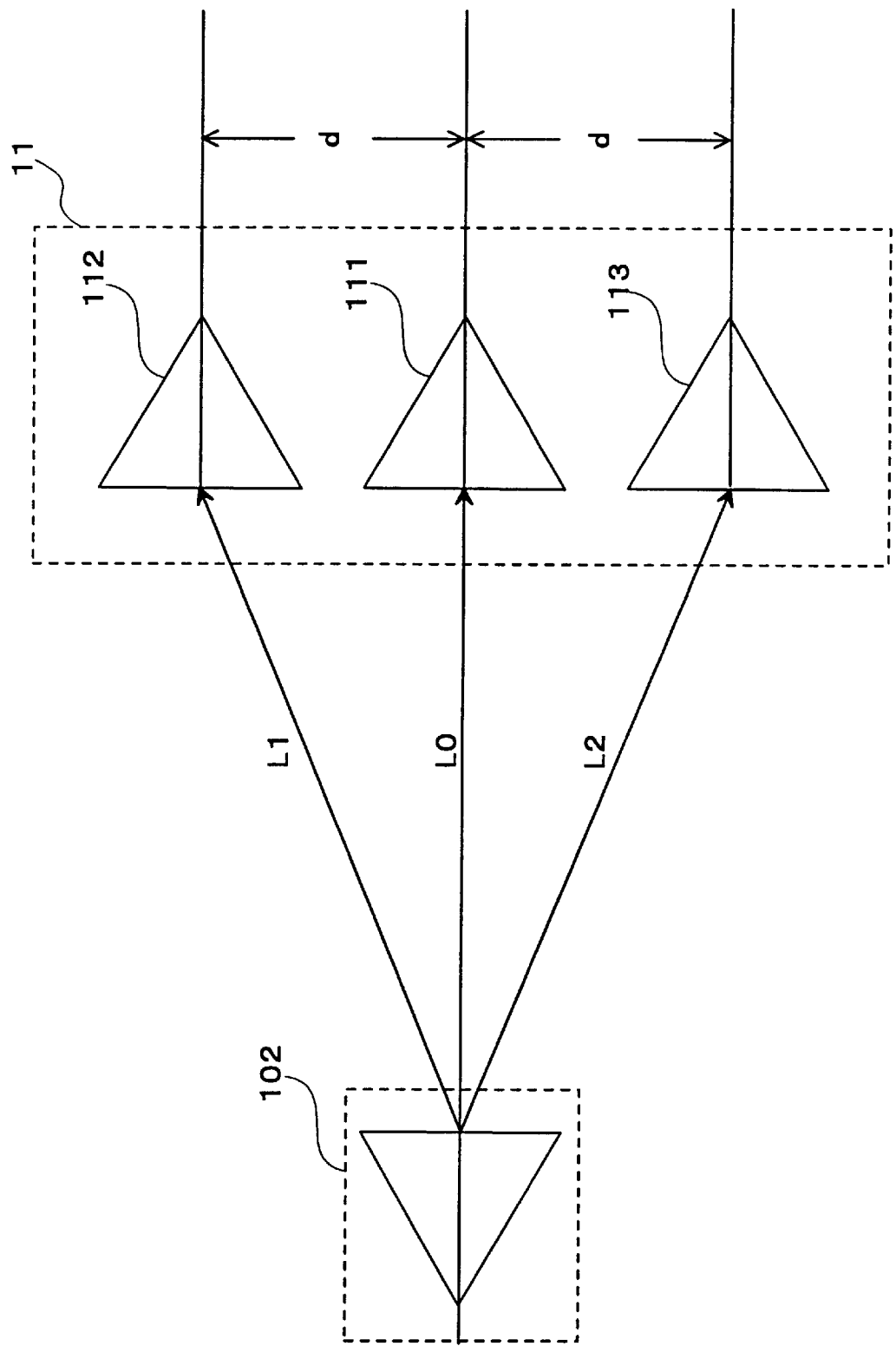
FIG. 11 is a diagram illustrating a principle of phase correction.

FIG. 10 illustrates a configuration of a radio wave arrival direction estimating antenna apparatus according to the fourth embodiment of the present invention. In FIG. 10, reference number 101 denotes a phase correcting section, and reference number 102 denotes a reference transmitter. FIG. 11 illustrates a principle of phase correction.

The following description will explain about operations in the radio wave arrival direction estimating antenna apparatus configured as described above. In FIG. 10, array antenna 11 receives a transmission test signal from reference transmitter 102 which is placed to be faced to array antenna 11. Each element of the array antenna has a propagation path difference due to a path length from the reference transmitter. FIG. 11 illustrates an example in which array antenna 11 with three antenna elements receives a signal form reference transmitter 102 and performs the phase correction. In the case where the array antenna has three elements, the reference transmitter is placed in front of antenna elements 111 that is a center of the array antenna, with both faced. A distance between the reference transmitter and the center element of the array antenna is predetermined, and in this case, the distance is assumed as L0. Because of distance d between each antenna element of the array antenna, distances LL and L2, which are respectively distances from the reference transmitter to other antenna elements 112 and 113 of the array antenna, are different from L0. Those values are obtained using the relation as follows:

$$L1 \times L1 = L0 \times L0 + d \times d;$$

and $$L2 \times L2 = L0 \times L0 + d \times d.$$

When a center antenna element of an array antenna is a reference, and the propagation wavelength of a radio wave is $\lambda$, each phase difference at a respective antenna element is obtained as follows:

$(L1-L0)/\lambda$ at antenna element 112; and $(L2-L0)/\lambda$ at antenna element 113.

Accordingly, measured data subjected to analog-digital conversion are compared between antenna elements, and the obtained value is used as a correction value.

As described above, according to the invention in this embodiment, since the phase correction is performed using the transmission test signal from the reference transmitter, it is possible to correct shifts of amplitude and phase due to deviations of devices such as antenna elements and a RF circuit, thereby making it possible to improve an accuracy of arrival direction estimation to a high accuracy.

In the antenna apparatus of the present invention, an array antenna receives a signal from a reference transmitter placed to be faced to the array antenna, and the data correcting section compares a phase amplitude of digital data corresponding to each antenna element output from the analog-digital conversion section, calculates the correction value including the path difference, and adds the correction value to the digital data. Then, using the thus obtained digital data, the arrival direction estimating section and the arrival direction tracking section estimate an arrival direction, and the data correcting section corrects an error of a circuit. Therefore, it is possible to eliminate phase differences except a phase difference due to an angle of the arrival direction of a radio wave to be input to each antenna element.

Fifth Embodiment

Figure 12:
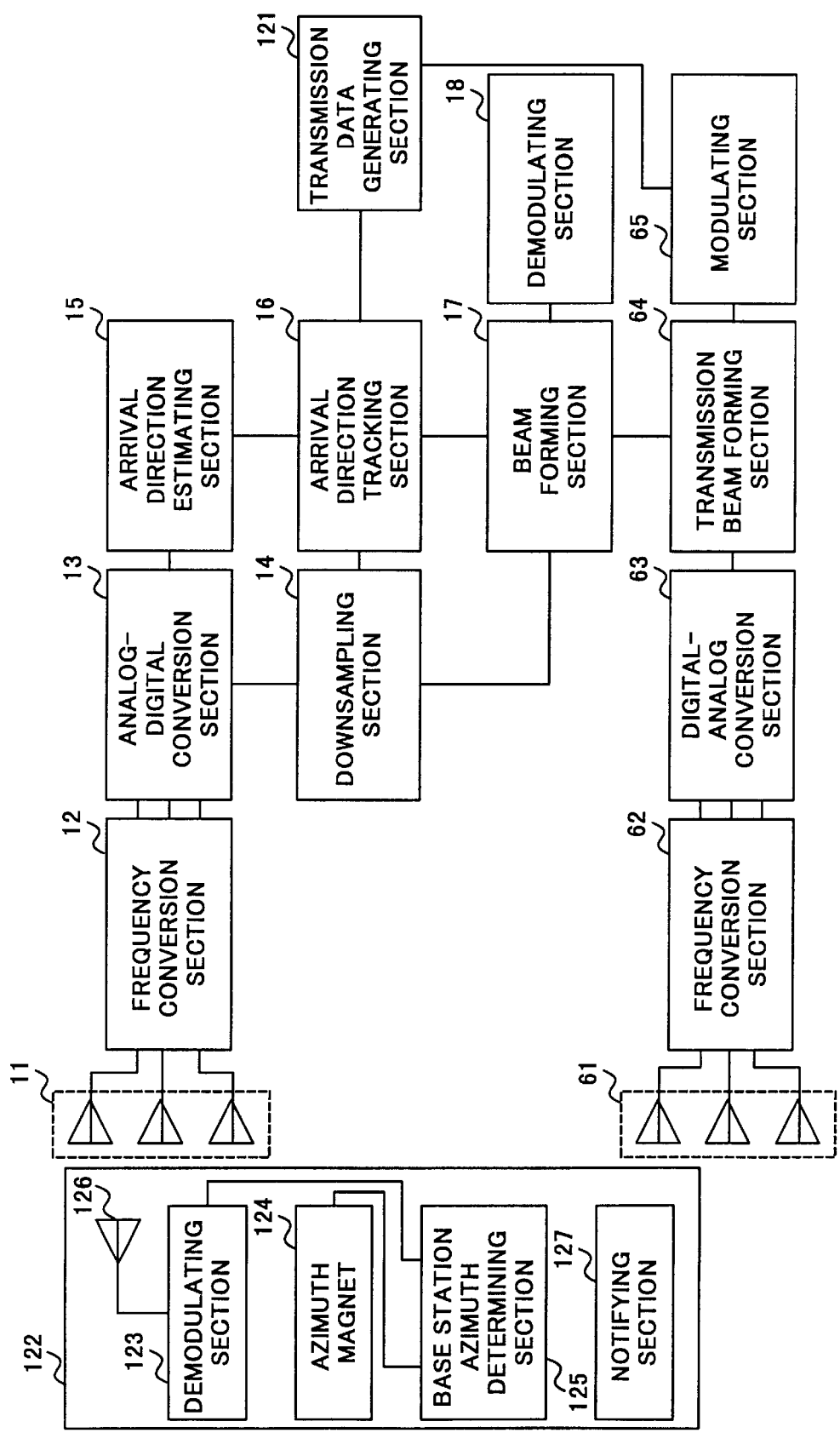
FIG. 12 is a block diagram illustrating a configuration of a radio wave arrival direction estimating antenna apparatus according to a fifth embodiment of the present invention.

FIG. 12 is a block diagram illustrating a configuration of a radio wave arrival direction estimating antenna apparatus according to the fifth embodiment. In FIG. 12, reference number 121 denotes a transmission data generating section, reference number 122 denotes a mobile station, reference number 123 denotes a demodulating section, reference number 124 denotes an azimuth magnet, reference number 125 denotes a base station azimuth determining section, reference number 126 denotes an antenna, and reference number 127 denotes a notifying section.

The following description will explain about operations in the radio wave arrival direction estimating antenna apparatus configured as described above. In FIG. 12, based on a direction of a mobile station estimated by arrival direction tracking section 16, transmission data generating section 121 generates data indicative of an angle between the direction and, for example, "north". The obtained data is provided to modulation section 65 to be transmitted from transmission array antenna 61 as a transmission signal. On the other hand, since a mobile station is provided with azimuth magnet 124, the mobile station knows the direction of, for example, "north". Based on the two kinds of information, base station azimuth determining section 125 determines a direction of a base station. Notifying section 127 notifies the determined result. When the mobile station is capable of been carried, such as a portable terminal, a person who grasps the mobile station directs the mobile station to the direction of the base station based on the information obtained in the base station azimuth determining section.

As described above, according to the invention in this embodiment, even in the case of a mobile station which cannon be provided with an arrival direction estimating section due to problems of space and cost, it is possible to determine a direction of a base station, and to direct the mobile station to the direction of the base station based on the determined information, thus achieving data transmission with high reliability.

As described above, according to the present invention, it is possible to execute the processing in a practical time for arrival direction estimation and antenna radiation pattern control with respect to a mobile station which moves around a base station with a high speed. Therefore, it is possible to perform data transmission with high reliability, and further to reduce interference in other base stations and other mobile stations and transmission power.

The present invention is not limited to the above described embodiments, and various variations and modifications may be possible without departing from the scope of the present invention.

This application is based on the Japanese Patent Application No.HEI10-287739 filed on Oct. 9, 1998, entire content of which is expressly incorporated by reference herein.

What is claimed is:

1. A radio wave arrival direction estimating antenna apparatus comprising:

an array antenna in a base station, the array antenna having a plurality of antenna elements each for receiving a radio wave transmitted from a mobile station;

frequency conversion means for frequency-converting a received RF frequency signal at each antenna element of said array antenna into a respective intermediate frequency signal;

analog-digital conversion means for converting said intermediate frequency signal into digital data;

downsampling means for sampling the digital data obtained in said analog-digital conversion means at a lower frequency;

arrival directing estimating means for estimating an arrival direction of the radio wave using digital data converted in said analog-digital conversion means;

arrival direction tracking means for estimating a change of the arrival direction of the radio wave from the mobile station, by using an estimated result in said arrival direction estimating means as an initial value and digital data sampled at a lower frequency in said down sampling means, to determine a direction sequentially.

2. The antenna apparatus according to claim 1, further comprising reception beam forming means for determining a weighting coefficient corresponding to a received signal at each antenna element, using an estimated result in said arrival direction tracking means, multiplying digital data converted with a second frequency by said downsampling means by the weighting coefficient, and adding all multiplication results, in order to direct an antenna radiation beam to a direction of the mobile station.

3. The antenna apparatus according to claim 2, further comprising demodulating means for demodulating using a processed result from said reception beam forming means.

4. The antenna apparatus according to claim 2, further comprising:

modulating means for generating a modulated signal of a digital baseband signal to be transmitted;

transmission beam forming means for multiplying a baseband signal by a weighting coefficient corresponding to each antenna element determined in said reception beam forming means to generate a weighted transmission signal, and directing an antenna radiation beam to the direction of the mobile station;

digital-analog conversion means for converting said weighted transmission signal into an analog signal; and frequency conversion means for frequency-converting said analog signal into a transmission RF frequency signal, wherein said transmission RF frequency signal is transmitted from said array antenna.

5. The antenna apparatus according to claim 4, further comprising a transmission array antenna for transmitting said transmission RF frequency signal.

6. The antenna apparatus according to claim 4, further comprising a switch for switching the transmission RF frequency signal and a received RF frequency signal according to a time division.

7. The antenna apparatus according to claim 4, further comprising in the base station:

transmission data generating means for providing data indicative of an estimated direction of the mobile station to the modulating means, and further comprising in the mobile station an antenna for receiving a signal transmitted from the base station;

demodulating means for demodulating the data indicative of the estimated direction of the mobile station;

an azimuth magnet;

base station direction determining means for determining a direction of a place where the base station exists using the data indicative of the estimated direction of the mobile station and the azimuth magnet; and notifying means for notifying a determined base station direction.

8. The antenna apparatus according to claim 1, further comprising:

a sector antenna comprising a plurality of antenna elements, and having radiation patterns to all directions by using all antenna elements;

antenna selecting means for selecting an antenna element of said sector antenna having a radiation pattern to a direction of a place where a mobile station exists, using the estimated result in said arrival direction tracking means; and demodulating means for demodulating the intermediate frequency signal converted in said frequency conversion means, wherein the analog-digital conversion means executes conversion at a lower conversion frequency than a conversion frequency for enabling demodulation.

9. The antenna apparatus according to claim 1, wherein one kind of conversion frequency in said downsampling means is $1/(M+0.25)$ times the intermediate frequency, where M is an integer number.

10. The antenna apparatus according to claim 1, wherein one kind of conversion frequency in said downsampling means is $1/(M+0.25)$ times the (intermediate frequency+ (bandwidth/2)), where M is an integer number, and a conversion frequency in said analog-digital conversion means is 16 times the one kind of conversion frequency.

11. The antenna apparatus according to claim 1, further comprising data correcting means for comparing a phase amplitude of digital data corresponding to each antenna element, obtained in said analog-digital conversion means, calculating the correction value including a path difference, and adding said correction value to the digital data, wherein said array antenna receives a test signal from a reference transmitter facing said array antenna, and said arrival direction estimating means and said arrival direction tracking means estimate the arrival direction, using said digital data with said correction value.

12. A radio wave arrival direction estimating antenna apparatus, comprising:

an array antenna, provided in a base station, having a plurality of antenna elements, each of the plurality of antenna elements being configured to receive a radio wave transmitted from a mobile station;

a frequency converter that converts a RF frequency signal received at each antenna element of the array antenna into a respective intermediate frequency signal;

an analog-digital converter that converts the intermediate frequency signal into digital data;

a down-sampler that samples the digital data obtained in the analog-digital converter at a lower frequency;

an arrival direction estimating section that estimates an arrival direction of the radio wave using the digital data converted in the analog-digital converter; and an arrival direction tracking section that estimates a change of the arrival direction of the radio wave from the mobile station, by using an estimated result in the arrival direction estimating section as an initial value and digital data sampled at the lower frequency in the down-sampler, to sequentially determine a direction.

13. The antenna apparatus according to claim 12, further comprising a reception beam former that determines a weighting coefficient corresponding to a received signal at each antenna element, using an estimated result in the arrival direction tracking section, multiplies digital data converted with a second frequency by the down-sampler by the weighting coefficient, and adds all multiplication results, in order to direct an antenna radiation beam to a direction of the mobile station.

14. the antenna apparatus according to claim 13, further comprising a demodulator that performs demodulation using a processed result from the reception beam former.

15. The antenna apparatus according to claim 13, further comprising: a modulator that generates a modulated signal of a digital baseband signal to be transmitted;

a transmission beam former that multiplies a baseband signal by a weighting coefficient corresponding to each antenna element determined in the reception beam former to generate a weighted transmission signal, the transmission beam former directing an antenna radiation beam to the direction of the mobile station;

a digital-analog converter that converts the weighted transmission signal into an analog signal; and a frequency converter that converts the analog signal into a transmission RF frequency signal, wherein the transmission RF frequency signal is transmitted from the array antenna.

16. The antenna apparatus according to claim 15, further comprising a transmission array antenna that transmit the transmission RF frequency signal.

17. The antenna apparatus according to claim 15, further comprising a switch that switches between the transmission RF frequency signal and a received RF frequency signal according to a time division.

18. The antenna apparatus according to claim 15, further comprising, in the base station, a transmission data generating section that provides data indicative of an estimated direction of the mobile station to the modulator, the antenna apparatus further comprising, in the mobile station, an antenna that receives a signal transmitted from the base station;

an azimuth magnet;

a base station direction determining section that determines a direction of a place where the base station is located using the data indicative of the estimated direction of the mobile station and the azimuth magnet; and a notifyin section that notifies a determined base station direction.

19. The antenna apparatus according to claim 12, further comprising:

a sector antenna that includes a plurality of antenna elements, and has radiation patterns to all directions by using all antenna elements;

an antenna selector that selects an antenna element of the sector antenna having a radiation pattern to a direction of a place where a mobile station is located, using the estimated result in the arrival direction tracking section; and a demodulator that demodulates the intermediate frequency signal converted in the frequency converter, wherein the analog-digital converter executes conversion at a lower conversion frequency than a conversion frequency for enabling demodulation.

20. The antenna apparatus according to claim 12, wherein one conversion frequency in the down-sampler is 1/(M+ 0.25) times the intermediate frequency, where M is an interger number.

21. The antenna apparatus according to claim 12, wherein one conversion frequency in the down-sampler is 1/(M+ 0.25) times the ( intermediate frequency+(band width/2)), where M is an integer number, and a conversion frequency in the analog-digital converter is 16 times the one conversion frequency.

22. The antenna apparatus according to claim 12, further comprising a data correcting section that compares a phase amplitude of digital data corresponding to each antenna element, obtained in the analog-digital converter, calculates a correction value including a path difference, and adds the correction value to the digital data, wherein the array antenna receives a test signal from a reference transmitter facing the array antenna, and wherein the arrival direction estimating section and the arrival direction tracking section estimate the arrival direction, using the digital data with the correction value.

* * * * *

UNITED STATES PATENT AND TRADEMARK OFFICE
CERTIFICATE OF CORRECTION

PATENT NO.     : 6,529,745 B1
DATED          : March 4, 2003
INVENTOR(S)    : T. Fukagawa et al.

It is certified that error appears in the above-identified patent and that said Letters Patent is hereby corrected as shown below:

<u>Title page</u>,
Item [73], Assignees, "Takashi Iida, Tokyo (JP)" should be -- Takashi Iida, Director General, Communications Research Laboratory, Ministry of Posts and Telecommunications, Tokyo (JP) --.

<u>Column 13</u>,
Line 39, "transmit" should be -- transmits --.

<u>Column 14</u>,
Line 31, "interger" should be -- integer --.

Signed and Sealed this

Fifteenth Day of July, 2003

JAMES E. ROGAN
*Director of the United States Patent and Trademark Office*